United States Patent [19]

Boland et al.

[11] Patent Number: 5,027,750
[45] Date of Patent: Jul. 2, 1991

[54] HEAT EXCHANGER FOR SUSPENSION OF LIQUID DROPS IN A VAPOR

[75] Inventors: David Boland, Lealhom; James C. Hill, Guisborough; Frederick H. Lancaster, Yarm, all of England; Andrew M. Day, Sherwood Park, Canada

[73] Assignee: Imperial Chemical Industries PLC, London, England

[21] Appl. No.: 531,731

[22] Filed: Sep. 13, 1983

[30] Foreign Application Priority Data

Sep. 16, 1982 [GB] United Kingdom ............... 8226412

[51] Int. Cl.⁵ ............................................. F22B 1/02
[52] U.S. Cl. .................................. 122/31.1; 122/414
[58] Field of Search ............... 122/31 R, 32, 33, 35, 122/36, 37, 414, 438, 442, 443; 165/60, 110, 172

[56] References Cited

U.S. PATENT DOCUMENTS

| | | | |
|---|---|---|---|
| 2,376,505 | 5/1945 | Rathbun et al. | 257/32 |
| 3,811,498 | 5/1974 | Ferraro et al. | 122/32 |
| 3,939,805 | 2/1976 | Michel | 122/32 |
| 4,208,987 | 6/1980 | Chaix et al. | 122/32 |
| 4,261,298 | 4/1981 | McDonald et al. | 122/32 |

FOREIGN PATENT DOCUMENTS

| | | | |
|---|---|---|---|
| 325040 | 6/1970 | Sweden | 122/31 R |
| 1208588 | 10/1970 | United Kingdom . | |

Primary Examiner—Henry A. Bennett
Attorney, Agent, or Firm—Cushman, Darby & Cushman

[57] ABSTRACT

Liquid and vapor are mixed and heated in a novel heat exchanger which comprises a shell, vertical heat exchange tubes, means for injecting vapor into the base of the shell, means for injecting liquid into a stream of the vapor and means to remove a stream of liquid droplets in vapor from an upper position of the shell.

2 Claims, 1 Drawing Sheet

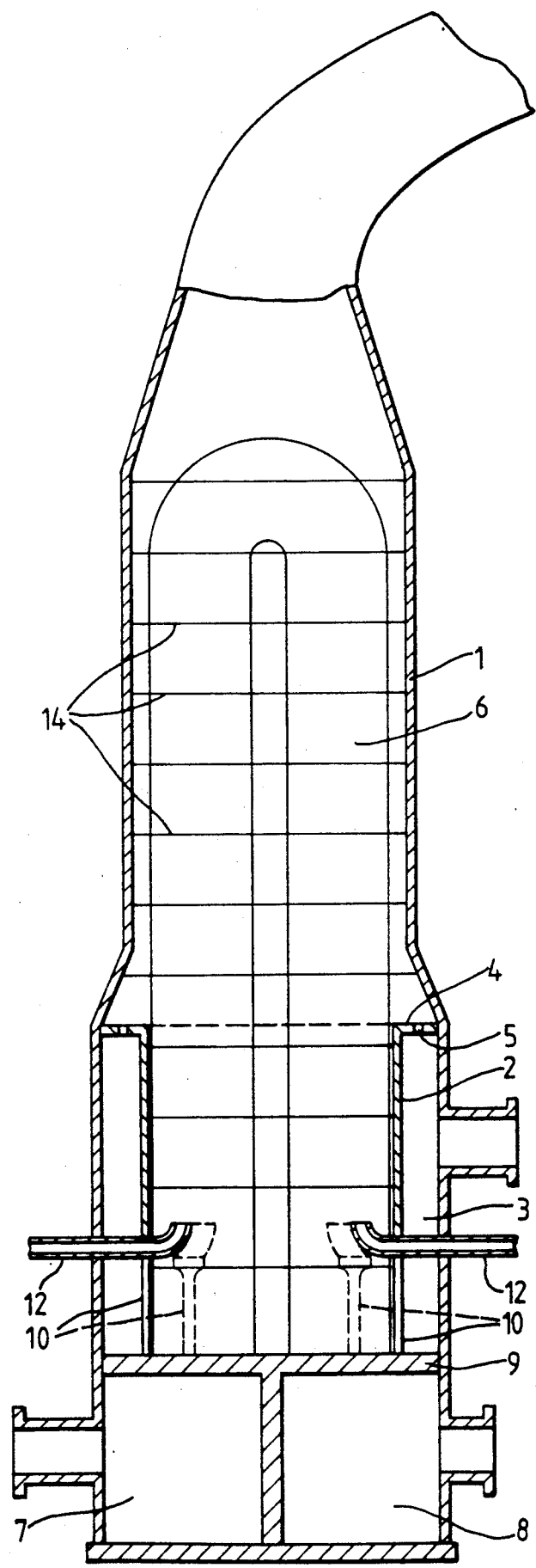

HEAT EXCHANGER FOR SUSPENSION OF LIQUID DROPS IN A VAPOR

This invention relates to heat exchangers.

It may be desirable in the process industries, especially the oil and chemical industries, to mix a vapor stream with a liquid stream to form a partially vaporized suspension of liquid droplets in vapor and to modify the temperature of the stream. This may be a suitable first stage in the total vaporization of the stream if it allows an optimum match of the temperatures of available process streams in a heat exchanger.

It is difficult to perform such an operation however, since there is a tendency for droplets to grow or coalesce and to separate from the vapor. If this occurs a pool of liquid may be formed at the bottom of a heat exchanger in which the temperature modification is to be made. Any passage of vapor through such a pool may cause bumping and vibration, and the non-uniformity of the vapor/liquid dispersion resulting from liquid disengagement tends to result in unpredictable operation of the heat exchanger resulting in reduced thermal efficiency.

According to this invention there is provided a heat exchanger which comprises a shell enclosing substantially vertical heat exchange tubes, means for injecting vapor into the base of the shell, means for injecting (preferably upwardly) liquid to be admixed with the vapor into a stream of the vapor for example at an intermediate position in the shell, and means to remove a stream comprising a suspension of liquid droplets in the vapor from an upper position of the shell. The heat exchanger is particularly suitable for raising the final heat content of the stream.

By "an intermediate position" is meant a position between the top and bottom of the shell; it is preferably nearer the bottom than the top.

The heat exchanger permits high vapor velocities to be secured at a low pressure drop and this, in combination with volatilization of the liquid due to admixture with the vapor and, preferably heating, minimizes disengagement of liquid droplets from the flowing suspension of droplets in liquid which is formed. It is preferred to use rod baffles to support the tubes, and these further minimize the pressure drop involved in the vapor flow and further break down liquid droplets.

Suitably the liquid being injected may be surrounded by a stream of vapor which is simultaneously being injected to assist entrainment, and an auxiliary stream of vapor may be provided from a lower point of the heat exchanger to carry droplets upwards.

If desired the liquid and vapor streams to be fed to the heat exchanger may be derived by separating a two phase liquid and vapor stream in a phase separator or knock out pot to produce both streams.

One form of heat exchanger according to the invention is shown in the accompanying drawing which shows a vertical cross section through it.

The heat exchanger comprises a shell 1 in a lower part of which is installed a dividing cylinder 2 which defines with the shell 1 a vapor introduction annulus 3. The upper boundary of the annulus 3 is defined by a ring 4 through which drain holes 5 are provided for use when the exchanger is shut down. (Further drainage points (not shown) are provided for draining annulus 3 during shut down). Within the shell are situated 256 U tubes filling substantially the whole internal volume of the major part of the shell with a central gap between the risers and downcomers. These are shown schematically 6. At the base of the shell are provided inlet and outlet chambers 7 and 8 communicating via U tubes 6. The bases of the U tubes are fixed to plate 9 (shown schematically, no communicating ports between the U tubes and the chambers being illustrated).

Six slots with enlarged heads 10 are formed at regular circumferential intervals through the base of cylinder 2 and liquid injection nozzles 12 are provided into the space surrounding the lower parts of the U tube bundles and passing through the heads of the slots.

Equally vertically spaced tube support structures 14 are provided to hold the U tubes 6 in place. These comprise sealing strips blocking the gaps between the outer U tubes and the wall of the shell 1 or cylinder 2 as the case may be and the central gap between the risers and downcomers. To each of the strips is secured an array of parallel rods passing through the alternate gaps between tubes. Thus each tube is touched once only by a rod of each array. Each tube support structure in sequence has rods orientated at an angle of 90° to those above and below it and displaced by one tube gap with respect to the second structure below it; thus each group of 4 support structures provides support for each tube tangentially at 90° intervals round its circumference.

The upper portion of the heat exchanger shell 1 may be smoothly bent as shown to deliver a product stream to adjacent equipment.

The heat exchanger is operated as follows. Hot heat exchange fluid is passed into chamber 7 through U tubes 6 and withdrawn from chamber 8. The liquid stream to be heated is introduced via nozzles 12 and vapor to be heated is introduced into annulus 3, from which it passes via slots 10 to the space between the bundles of U tubes 6. Vapor rises through the tube bundles from the lower parts of slots and vapor from the enlarged heads of the slots surrounding the nozzles carries with it liquid injected via the nozzles and heat is absorbed from the U tubes. The tube support structures 14 assist in breaking the droplets and a stream comprising droplets in vapor is withdrawn from the top of the shell.

We claim:

1. A process for mixing a liquid stream with a vapor stream and for passing a suspension of the liquid in droplet form in the vapor in heat exchange relationship with a heat exchange fluid flowing through substantially vertical heat exchange tubes located within a shell comprising: injecting a stream of the vapor free to the liquid into the base of the shell; separately and simultaneously injecting a stream of the liquid free of the vapor into the shell in a manner to form the suspension of droplets of the liquid in the vapor; passing the suspension upwardly along the heat exchanger tubes; and subsequently removing the suspension from the shell.

2. A process as in claim 1 wherein the liquid is water and the vapor is steam.

* * * * *